United States Patent [19]

Roger

[11] Patent Number: 4,726,817
[45] Date of Patent: Feb. 23, 1988

[54] METHOD AND DEVICE FOR RECOVERING IN LIQUID FORM THE WATER PRESENT IN THE ATMOSPHERE IN VAPOR FORM

[76] Inventor: Rippert Roger, 8 bis, rue de la Faucille, F-74000 Annemasse, France

[21] Appl. No.: 919,721
[22] PCT Filed: Jan. 23, 1986
[86] PCT No.: PCT/FR86/00020
  § 371 Date: Sep. 23, 1986
  § 102(e) Date: Sep. 23, 1986
[87] PCT Pub. No.: WO86/04258
  PCT Pub. Date: Jul. 31, 1986

[51] Int. Cl.⁴ .................................................. B01D 53/04
[52] U.S. Cl. .................................. 55/33; 55/80; 55/208; 55/269; 165/111
[58] Field of Search ............... 55/21, 33, 80, 208, 55/267, 269, 445; 165/111, 113; 202/234; 203/DIG. 1

[56] References Cited

U.S. PATENT DOCUMENTS

| | | | |
|---|---|---|---|
| 1,649,482 | 11/1927 | Metzger et al. | 165/113 X |
| 1,792,056 | 2/1931 | Armbrust | 55/445 X |
| 1,797,894 | 3/1931 | Armbrust | 55/445 |
| 1,816,592 | 7/1931 | Knapen | 165/111 X |
| 1,987,604 | 1/1935 | Corbett | 165/111 X |
| 2,138,689 | 11/1938 | Altenkirch | 203/DIG. 1 |
| 2,761,292 | 9/1956 | Coanda et al. | 55/208 X |
| 2,970,669 | 2/1961 | Bergson | 165/111 X |
| 3,436,313 | 4/1969 | van Bavel et al. | 202/234 X |
| 3,818,718 | 6/1974 | Freese | 165/113 X |
| 3,875,926 | 4/1975 | Frank | 203/DIG. 1 |
| 4,185,969 | 1/1980 | Bulang | 55/208 X |
| 4,219,341 | 8/1980 | Hussmann | 55/208 X |
| 4,285,702 | 8/1981 | Michel et al. | 55/80 X |
| 4,304,577 | 12/1981 | Ito et al. | 55/208 X |
| 4,351,651 | 9/1982 | Courneya | 165/111 X |

FOREIGN PATENT DOCUMENTS

| | | | |
|---|---|---|---|
| 2827755 | 1/1980 | Fed. Rep. of Germany ... | 203/DIG. 1 |
| 2830705 | 1/1980 | Fed. Rep. of Germany | 55/208 |
| 682352 | 5/1930 | France . | |
| 26331 | 2/1982 | Japan | 55/208 |
| 1015231 | 4/1983 | U.S.S.R. | 165/113 |

Primary Examiner—Robert Spitzer
Attorney, Agent, or Firm—Sughrue, Mion, Zinn Macpeak & Seas

[57] ABSTRACT

Ambient air (2) is canalized and cooled in a free space (4) delimited by a thermally insulated enclosure (1) and a radiating heat exchanger (3) of which the outer face (6) is heat-absorbing and the inner face (5) is heat-radiating. Air is then passed through a curtain of hygroscopic fibres (11) where water vapor condensates into liquid water which is evacuated through a conduit (14) and, once dried, air is heated by flowing at the inside (8) of a radiator (7) recovering thermal energy emitted by the face (5) of the heat exchanger (3) through a transparent thermally insulating volume (12). Dry air is then exhausted through a vent (9) to the atmosphere. Since air circulates naturally, it is possible to recover, autonomously and without any other energy supply, water contained in vapor form in the atmosphere of the implantation site.

10 Claims, 1 Drawing Figure

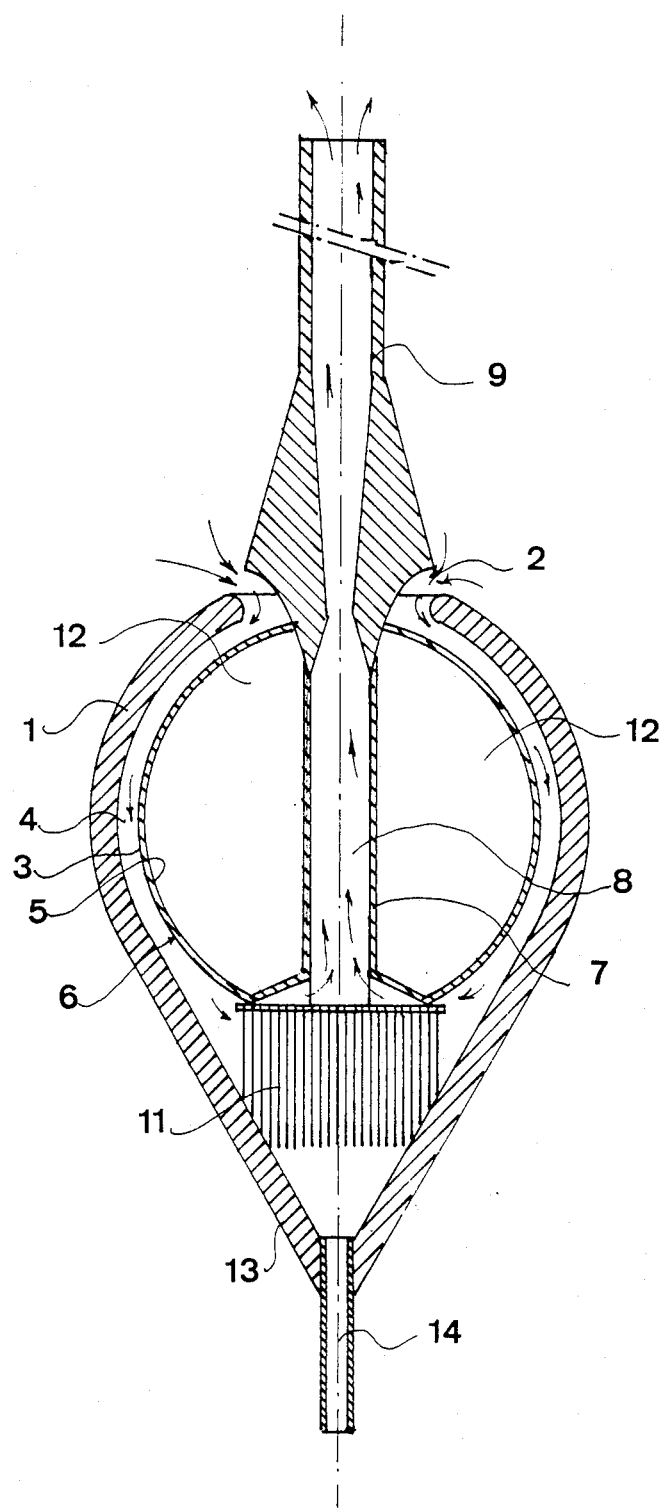

METHOD AND DEVICE FOR RECOVERING IN LIQUID FORM THE WATER PRESENT IN THE ATMOSPHERE IN VAPOR FORM

FIELD OF THE INVENTION

The present invention relates to obtaining liquid water by extraction and condensation of the water vapor present in the atmosphere. It relates to a method and to a device for obtaining same.

BACKGROUND OF THE INVENTION

Methods and devices are known which are used to dehumidify an atmosphere in which the ambient air comprising said atmosphere is set in motion by mechanical means and cooled below the dewpoint on contact with the evaporator of a refrigeration group and on which it leaves part of its water content, in particular in the form of frost.

Devices are also known in which the air, which is set in motion by mechanical means, passes through hydrophilic granules, for example silico-aluminates, which capture all or part of the vapor which is present and which, when saturated, have their properties regenerated by being brought to a temperature above 100° C. so as to extract the water therefrom in the form of vapor which must still be condensed so as to obtain the liquid water.

In other devices the air, which is preferably cooled, passes in forced circulation through a mass of hygroscopic fibers, on contact with which the vapor condenses in whole or in part and the liquid water obtained is then removed.

In these known apparati, the object is basically to lower the hygrometric degree of the atmosphere without seeking to produce liquid water and they therefore have a certain number of disadvantages or inadequacies which adapt them poorly to this function. If it is desired to obtain liquid water in substantial quantities and at an affordable cost, particularly in places where its rarity causes it to be a precious liquid, these methods and devices are totally unsuitable, especially due to their low yield, their high energy cost, both of manufacturing and of operation, and their lack of autonomy.

It is these major disadvantages which the present invention seeks to eliminate by proposing a method and a device whose operation are autonomous and free, without requiring a particular infrastructure, and can be carried out in any place where water vapor is present in the atmosphere and where the need for liquid water is felt.

The characteristics of the invention which are repeated in the claims and certain of these advantages will become apparent in light of the following description, for the understanding of which reference is made to the single FIGURE of drawings which schematically represents in elevation and in cross-section a device which can be used for carrying out the invention.

SUMMARY OF THE INVENTION

The invention basically uses the property of certain appropriately treated bodies to behave under radiation, and particularly in the field of infrared radiation, like real black bodies and to radiate their own energy such that their temperature can be lowered considerably below that of their surroundings. Such bodies as those particularly mentioned in the article by Felix Trombe "Perspectives on the use of solar and terrestrial radiation in certain regions of the world" in the publication "Heating, ventilation, conditioning", No. 8, November-December 1974, will be referred to hereinbelow as "radiating heat exchangers".

In accordance with the invention, the ambient air containing water in the form of vapor is cooled by at least one radiating heat exchanger, the length of which is canalized, and tends to descend due to the increase in its volume. The exchanger removes from the air a part of its heat content and transfers it by electromagnetic radiation, which is basically infrared, to at least one radiator which absorbs it. The cooled air passes through a mass of hygroscopic fibers on which the vapor condenses, producing liquid water which is collected. The dried air then passes in a pipe where it is heated by the radiator and escapes naturally into the surroundings due to the decrease in its volume.

It can be seen that the circulation of the air subjected to the method takes place naturally, by the sole play of the temperature, volume and pressure gradients in its path, and that no additional energy supply is necessary, neither for setting it in motion nor for extracting the water therefrom.

BRIEF DESCRIPTION OF THE FIGURE

The following description refers to the drawing of a device in accordance with the invention in the form of a vertical, sectional view, which will enable a review of the various phases of the method and will provide a better understanding thereof.

DESCRIPTION OF THE PREFERRED EMBODIMENT

The device shown in the drawing comprises an exterior thermally insulating first chamber 1 whose main part has a general approximately spherical shape and which is preferably conical in the shape of a funnel having an annular opening in its upper part, which provides an entry 2 for the ambient air. Inside this first chamber 1 and approximately concentric thereto there is a second chamber 3 whose shape is adapted to the first chamber, such that between them they define a free space or absorption volume 4. A third chamber 7, which defines an interior channel 8, is arranged inside the second chamber 3 in accordance with its vertical diameter and defines therewith a closed volume 12. The lower part of this third chamber 7 communicates with the free space 4 and its upper part extends, by means of a preferably thermally insulated open vent 9 into the atmosphere. There is therefore a continuous free path for the air from the entry 2 to the exit of the vent 9, through the free space 4 and the interior or heating volume 8 of chamber 7. The bottom of the funnel 13 is, moreover, bored and provided with a channel 14 which can also act as a support for the assembly of the device. A curtain of hygroscopic fibers 11 is arranged under the second 3 and third 7 chambers, in funnel 13.

The second chamber 3 is a radiating heat exchanger. Its exterior surface 6 which partially defines the free space 4, which hereinafter is also called absorption volume, is absorbent to electromagnetic radiation and its internal surface 5, which partially defines the insulating volume 12, is radiating. The third chamber 7 constitutes a radiator which is insulated from the preceding chamber by means of volume 12 and by a thermally insulating material to the right of its junction therewith. The volume 12, which is a poor heat conductor, is transparent to electromagentic, basically infrared radiation and is therefore free from humidity.

The radiating heat exchanger 3 can be composed of a sheet of material known by the name "Permaloid" comprising 97% aluminum and 3% magnesium, which is polished from rolling and then treated. An appropriate treatment for the absorbent surface 6 may be immersion in a bath of from 5 to 20 g/l of $KMnO_4$ and $H_2SO_4$ in a quantity corresponding to a pH of approximately 1 and for the radiating surface may be anodic oxidation until a layer on the order of 25 $\mu$m of hydrated aluminum is obtained. Other suitably treated materials can also be used for preparing the unidirectional radiating heat exchanger 3. This specific preparation is not a characteristic of the invention and requires no further development.

The radiating heat exchanger 3 discharges a part of its own energy by radiation, which is basically infrared, in wavelengths of from free space 4 to 25 $\mu$m and tends to cool heat exchanger 3 below the temperature of its surroundings composed of the air present in the absorption volume 4, with the difference in temperature capable of reaching on the order of 8° to 10° C. if the radiation is optimal and with volume 12 being free of any humidity and insulating the internal surface 5 of heat exchanger 3 from any supply of radiated energy. Since, as is known, the heat content of the air in the absorption volume 4 tends towards a minimal balance of energy, the radiating heat exchanger 3 absorbs through its surface defining said volume a part of said heat content, the result of which is a cooling of the air, which, since its volume increases, tends to descend in the direction of the funnel 13.

At the same time radiator 7, which captures the energy radiated by the radiating exchanger 3, heats the so-called heating air present in heating volume 8. Seeing its volume decrease, this air rises towards vent 9 and is evacuated into the atmosphere. A natural circulation of air between the absorption 4 and heating 8 volume results and a permanent regime is thus established between the input 2 and the evacuation 9.

The air cooled at absorption volume 4 passes through the curtain of hygroscopic fibers 11 where the water vapor condenses in droplets which, due to gravity, are collected in funnel 13 and removed by channel 14 to an installation for stocking and/or use.

It is clear from the above that other geometric shapes for various components of the device may be used depending on the performances to be obtained, the constraints of use and the costs of production, with the optimal shapes and sizes resulting from a compromise of these considerations.

In all cases, it can be seen that the method and device in accordance with the invention are perfectly autonomous from an energy point of view, require no mechanical moving parts and can be implanted in all locations without a special infrastructure.

I claim:

1. A method for recovering in a liquid form water present in vapor form in an atmosphere, comprising the steps of; cooling by canalizing (4) the ambient air by means of at least one radiating heat exchanger (3) by capturing (6) a part of the content of the ambient air and transferring it by radiation (5) to at least one radiator (7), canalizing (4) of the cooled air and passing it in contact with hygroscopic fibers (11) and causing water vapor to condense on said hygroscopic fibers and thereby drying said cooled air, heating (8) the dried air after its passage in the hygroscopic fibers (11) by means of said at least one radiator (7), allowing it to pass naturally (9) towards the atmosphere and collecting (13, 14) the liquid water obtained from the hygroscopic fibers (11).

2. The method in accordance with claim 1, wherein the step of cooling the air coming (2) from the atmosphere is carried out by causing a natural circulatory passage of said air in a volume defined by a thermally insulating chamber (1) and an exterior absorbent surface (6) of said at least one radiating heat exchanger (3).

3. The method in accordance with claim 2, further comprising the step of reheating the dried air by effecting a natural circulatory flow thereof in a channel (8) inside the radiator (7).

4. A device for, recovering in liquid form water present in vapor form in atmosphere; said device comprising a first thermally insulating chamber (1), a radiating heat exchanger (3) forming a second chamber inside the first chamber (1) and defining therewith a free space (4) open (2) to the atmosphere at its upper part, said radiating heat exchanger (3) having an external surface (6) which is heat-absorbent and an internal surface (5) which is heat-radiating, and a radiator (7) forming a third chamber inside the second chamber and defining an interior volume (8) and first means communicating said interior volume (8), at its upper part (9) with the atmosphere, and a curtain of hygroscopic fibers (11) within said first means communicating the free space (4) and the interior volume (8), whereby the ambient air is cooled by; canalizing the ambient air by means of said at least one radiating heat exchanger (3) capturing a part of the content of the ambient air and transferring it by radiation to said at least one radiator (7); canalizing the cooled air and passing it in contact with the hygroscopic fibers and causing water vapor to condense on the hygroscopic fibers and; drying said cooled air, heating the dried air after its passage in the hygroscopic fibers by means of said at least one radiator and allowing it to pass naturally towards the atmosphere while collecting the liquid water obtained from the hygroscopic fibers.

5. The device in accordance with claim 4, wherein the radiating heat exchanger (3) and the radiator (7) define a closed heat-insulating volume (12) which is transparent to heat radiation.

6. The device in accordance with claim 4, wherein the interior volume (8) of radiator (7) communicates with the atmosphere by means of a vent (9).

7. The device in accordance with claim 6, wherein the vent (9) is thermally insulated.

8. The device in accordance with claim 4, wherein the first chamber (1) is provided at its lower end with a channel (14) enabling the extraction of the water coming from the curtain of hygroscopic fibers (11).

9. The device in accordance with claim 8, wherein the channel (14) constitutes a support for the implantation of the device.

10. The device in accordance with claim 4, wherein the first chamber (1) and the exchanger (3) have approximately spherical concentric shapes, in which the radiator (7) is approximately vertical and wherein the first chamber (1) is extended downwardly by a conical shaped funnel (13).

* * * * *